Nov. 8, 1960   E. B. FERNBERG   2,958,915
BEADING FASTENERS
Filed Jan. 28, 1957

INVENTOR
ERIC BIRGER FERNBERG
ATTORNEY
Malcolm W. Fraser

United States Patent Office 2,958,915
Patented Nov. 8, 1960

2,958,915

BEADING FASTENERS

Eric Birger Fernberg, Northwood, England, assignor to F. T. Products Limited, London, England, a British company Filed Jan. 28, 1957, Ser. No. 636,592

Claims priority, application Great Britain Jan. 31, 1956

4 Claims. (Cl. 24—73)

The present invention relates to a fastener which may be used with advantage, although not exclusively, in the automobile industry for attaching a beading to a panel.

It is common practice at the present time to secure chromium plated beadings to a metal panel by means of a series of fasteners each of which is secured in a hole in the panel, after which the beadings, usually of C-section, are snapped over the fasteners.

When so secured to the fasteners, the beading is held tight against the panel and cannot move transversely of its length, but may be free to slide over the fasteners in the longitudinal direction.

In some situations this is a disadvantage and a variety of expedients have been used to prevent the beadings from moving in this way. For example, a positioning lug has been provided on the beading, which fits in a second hole formed in the panel. All such expedients are, however, relatively costly to make or assemble and it is therefore an object of this invention to provide a simple fastener with which longitudinal movement of the beading is prevented.

The object of this invention is achieved by having an edge on the fastener located obliquely with respect to, and pressed resiliently against, an edge of the beading. Normally this is achieved by having a lug disposed in a plane which intersects that of the flange along a line which is neither perpendicular to both said edges nor coincident with either of them.

Figure 1:
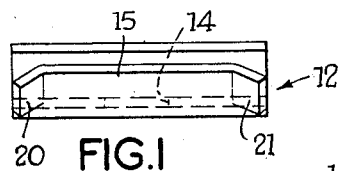
Figure 2:
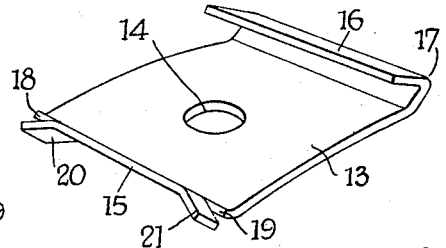
Figure 3:
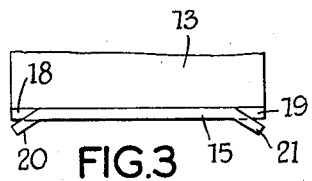
Figure 4:
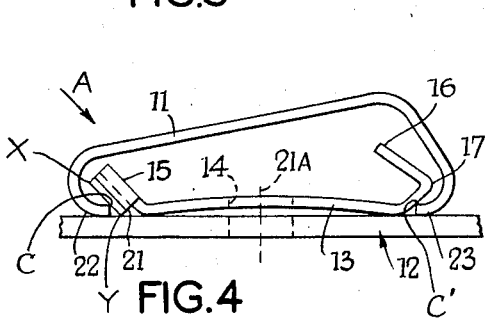
Figure 5:
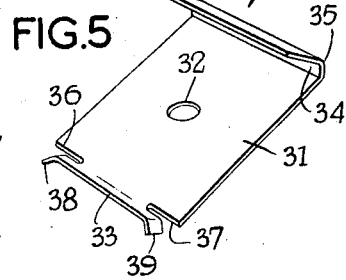
Figure 6:
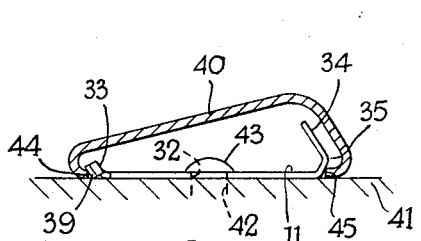
Figure 7:
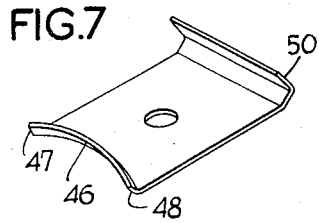
Figure 8:
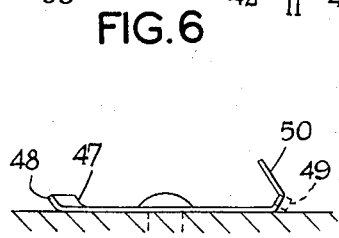
Figure 9:
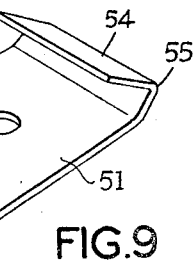

Preferred forms of the invention will now be described with reference to the accompanying diagrammatic drawings, in which:

Figures 1 and 2 are respectively an end elevation and perspective view of the fastener, Figure 3 is a view taken in the direction A of Figure 4, Figure 4 is a side elevation of the same fastener and shown holding a beading to a panel, Figure 5 is a perspective view of another fastener, Figure 6 is a side elevation of the fastener of Figure 5 shown holding a beading to a panel, Figures 7 and 8 are a perspective view and side elevation respectively of another fastener, and Figure 9 is a perspective view of yet another fastener.

Referring now to Figures 1 to 4, the fastener here shown is formed from a single strip of metal which, before being rendered rustproof and resilient, is sheared and pressed to the shape shown so as to have a body 13 with an upward bow, a hole 14, a limb 15 and a wing 16 which is formed with an elbow 17. Short nicks are made at 18 and 19 where the limb 15 meets the body 13 and the ends of the limb 15 are turned down to form lugs 20 and 21.

In the panel 10 (Figure 4) are formed a series of holes lying along the length of the position to be occupied by a beading 11. A fastener is laid over each hole and secured therein with a rivet, screw or the like (not shown) in a position 21A such that the limb 15 and wing 16 lie approximately in the direction to be taken by the beading 11.

One flange 22 (Figure 3) of the beading is then placed under the lugs 20, 21 and the other flange 23 snapped over the elbow 17 on the wing 16 so that the beading takes up the position shown in Figure 4. In this position the corners of the edges of the lugs 20 and 21 bite into the corners of an edge of the flange 22 of the beading to prevent it moving in the direction of its length.

Movement in the transverse direction is prevented because the flanges of the beading are pressed resiliently against limb 15 and wing 16 respectively.

The fastener 30 shown in Figures 5 and 6 is formed from a single strip of spring metal which, before being rendered resilient, is sheared and pressed to the shape shown so as to have a flat body 31, a hole 32, a limb 33 and a wing 34 which has an elbow 35. Short cutaway areas are formed at 36 and 37 where the limb 33 meets the body 31 and the ends of the limb 33 are turned down to form lugs 38 and 39, each of which is in the form of a leafspring with one end integral with the limb 33.

Figure 6 illustrates how such fasteners may be used to secure a C-section beading 40 to a metal panel 41. In the panel are formed a series of holes (such as 42) lying along the length of the position to be occupied by the beading. A fastener is laid over each hole and secured therein with a rivet 43, screw or the like in a position such that the limb 33 and wing 34 lie approximately in the longitudinal direction to be taken by the beading 40.

One flange 44 of the beading is then placed under the spring lugs 38 and 39, and the other flange 45 is snapped over the elbow 35 on the wing 34 so that the beading takes up the position shown in Figure 6. In this position the corners of the edges of the lugs 38 and 39 bite into a corner of the edge of the flange 44 of the beading to prevent the beading from moving in the direction of its length, i.e. longitudinally of itself. Movement in the transverse direction is prevented because the flanges of the beading are pressed resiliently against limb 33 and wing 34 respectively.

The fastener shown in Figure 7 differs from that of Figures 5 and 6 in that the cutaway areas 36 and 37 are omitted and the limb 46 is bowed over its whole length so that its ends 47 and 48 provide the lugs which bite into the beading.

As illustrated in broken lines at 49 in Figure 8, similar lugs may be provided on the ends of the wing 50.

The fastener shown in Figure 9 has a plate-like body 51 one end of which is of shallow arrow-head shape as at 52, 53. The other end has a wing 54 formed with an elbow 55. A hole 56 for a rivet or the like is formed in the centre of the body. The end of the body opposite the wing 54 has a cut-away area or notch 57 formed in it, after which the two portions 52 and 53 are bent upwardly, with the result that the adjacent inner ends 58, 59 of the portions 52, 53 constitute lugs designed to bite into an edge of a beading to stop it moving longitudinally.

Any of the fasteners described above may be formed with only one lug instead of the two illustrated in each case. When so provided with only one lug the fastener is unidirectional in function, in the sense that it will hold the beading from moving longitudinally with respect to the panel in one sense only. This affords the possibility of sliding a beading over a plurality of similar unidirectional fasteners, and then affixing a last beading which is either unidirectional in the opposite sense to that of the plurality, or has two lugs of opposite sense, so that finally the beading is held from moving longitudinally in both senses.

It will be appreciated that with all of the fasteners described above, contact between the lug and the flange of the beading occurs at one point only. Thus, referring to Fig. 4 for example, contact is made at the point C in this figure. Furthermore, contact occurs in all cases at a point where two lines intersect; in Fig. 4 the two lines are, respectively, X Y on the lug and that line on the beading which passes through point C in a direction perpendicular to the plane of Fig. 4. In the appended claims these two lines are called "linear corners" of the lug or flange.

Since the beading and fastener are permanently pressed together, owing to the resilience of one or both of these members, the two linear corners dig into one another a little and it is this feature which prevents the beading from slipping over the fastener.

For the same reason the "point" contact becomes a contact over a small area, and the references herein to point contact are to be construed as including such contact over small areas.

What I claim is:

1. An assembly of a panel, beading and fastener secured together, the beading having a pair of longitudinal flanges, one of which is bounded in part by two planes forming a dihedral angle and the fastener comprising a body formed with means cooperating with panel holding means for securing the beading against the panel, said fastener also having means for engaging said one flange including a lug which is also bounded in part by two planes forming a dihedral angle and which is pressed against said one flange to prevent longitudinal movement of the beading with respect to the panel, wherein contact between said lug and said one flange occurs at only one point which is located at the intersection of the two apices of the said two dihedral angles respectively and the angle between the said two apices is approximately a right angle.

2. An assembly as claimed in claim 1, wherein the line which lies in a plane normal to the apex of the dihedral angle of said one flange and bisects that angle is approximately collinear with the line which lies in a plane normal to the apex of the dihedral angle of said lug and bisects the last-mentioned angle.

3. An assembly as claimed in claim 1, wherein the two planes forming each dihedral angle are inclined at an angle which is not substantially greater than 90°.

4. An assembly as claimed in claim 1, wherein said lug is in the form of a leaf spring having one end integral with the body of the fastener, and the other directed to lie against an edge of said one flange.

References Cited in the file of this patent

UNITED STATES PATENTS

| | | |
|---|---|---|
| 2,109,219 | Fearing | Feb. 22, 1938 |
| 2,166,889 | Churchill | July 18, 1939 |
| 2,214,150 | Van Uum | Sept. 10, 1940 |
| 2,249,902 | Kral | July 22, 1941 |
| 2,295,449 | Churchill | Sept. 8, 1942 |
| 2,585,996 | Brown | Feb. 19, 1952 |

FOREIGN PATENTS

| | | |
|---|---|---|
| 927,903 | Germany | May 20, 1955 |